United States Patent [19]

Toyota

[11] Patent Number: 5,032,304
[45] Date of Patent: Jul. 16, 1991

[54] METHOD OF MANUFACTURING TRANSPARENT HIGH DENSITY CERAMIC MATERIAL

[75] Inventor: Sachio Toyota, Osaka, Japan

[73] Assignee: Sumitomo Special Metal Co. Ltd., Osaka, Japan

[21] Appl. No.: 474,340

[22] Filed: Feb. 2, 1990

[30] Foreign Application Priority Data

Feb. 2, 1989 [JP] Japan .................................. 1-25474

[51] Int. Cl.$^5$ .............................................. C04B 35/48
[52] U.S. Cl. ..................................... 252/62.9; 501/134
[58] Field of Search ............... 501/134; 252/62.9, 582, 252/583, 584; 264/2.2, 66, 67, 65

[56] References Cited

U.S. PATENT DOCUMENTS 3,666,666  5/1972  Haertling ........................... 252/62.9
3,917,780  11/1975  Mazdiyasni et al. .................. 264/61

*Primary Examiner*—Karl Group
*Assistant Examiner*—Chris Gallo
*Attorney, Agent, or Firm*—Watson, Cole, Grindle & Watson

[57] ABSTRACT

A method of manufacturing a transparent, high density green material which comprises: sintering a PLZT ceramic compact in a vacuum of $1 \times 10^{-2}$ to $1 \times 10^{-5}$ Torr at 1150° C. to 1250° C. for 0.5 to 2 hours, fabricating the sintering product into a sheet of less than 1.5 mm thickness, embedding the sheet into a heat resistant vessel tightly packed with a powder of 50 μm to 3000 μm grain size comprising at least one of fused alumina, zirconia and magnesia and then applying HIP under 500 to 700 kg/cm², at 1050° C. to 1200° C., for 0.5 to 2 hours by using an inert gas as a pressure medium. Ceramics for optical devices having high transparency and density can be mass produced economically in a short time.

9 Claims, 2 Drawing Sheets

METHOD OF MANUFACTURING TRANSPARENT HIGH DENSITY CERAMIC MATERIAL

BACKGROUND OF THE INVENTION

1. Field of the Invention

The present invention relates to a method of manufacturing a transparent high density ceramic material containing oxides of Pb, La, Zr and Ti (hereinafter referred to as PLZT), and in particular to a manufacturing method which includes hot isostatic pressing of a sintered PLZT product for a short period of time.

2. Description of the Prior Art

PLZT has been used for various optical devices depending on the relative content of Pb, La, Zr and Ti, oxides for example, optical modulation devices which utilize the Pockels effect, optical shutters and optical switches which utilize the Kerr effect, image memory devices which utilize the memory effect, as well as optical shutters which make use of the electro-optical scattering effect, image memory devices which makes use of the surface electrostriction effect, optical memory devices which make use of the photochromic effect, image memory devices which make use of an optical ferroelectric effect, etc.

When PLZT is used as the transparent high density ceramic material, extremely high transparency is required in order to prevents scattering or absorption of light passing through the ceramic material.

Accordingly, it is necessary to reduce pores in the inside of the PLZT and to remove excess Pbo, which causes the PLZT yellow and absorb light.

As a method of obtaining PLZT, there is known a so-called monoaxial pressing-type hot pressing method of charging a starting material powder for PLZT ceramic in a die made of aluminum oxide, silicon carbide, graphite, etc; and then pressing the powder by means of a punch made of alumina (U.S. Pat. No. 3,666,666, 1972).

In this method, however, there is a limit for the size of products obtained in view of the strength of die, and punch at high temperature and uniform heating by using an external heater. Further, reaction between the punch or die material and the pressing product is inevitable and, further, the productivity is low.

Meanwhile, as a method of manufacturing piezoelectric ceramics, a hot isostatic pressing method (hereinafter referred to as HIP) using a high temperature and high pressure gas as a pressure medium is known and the applicant has previously proposed a method of manufacturing high density piezo ceramics such as $PbTi_3$, $PbNb_2O_6$, $PbTi_xZr_yO_3+Nb_2O_5$, etc; by using HIP (Japanese Patent Laid-Open Sho No. 58-182883).

However, even if the above-mentioned method is applied to PLZT, it is difficult to completely remove pores formed at the inside of the PLZT and, particularly, it is impossible to remove large pores, thus making it difficult to attain high transparency and high density as required as an optical device. Further, there is also been known an atmospheric sintering method of sintering in a PbO-oxygen atmosphere as a method of removing large pores formed upon sintering PLZT. However, it is difficult to control the PbO vapor pressure. If the PbO vapor pressure is higher than a predetermined pressure, excess PbO intrudes to the inside of the PLZT, thus turning the PLZT yellow. On the contrary, if the PbO pressure is low, the invasion of PbO can be prevented; however pores in the inside of the PLZT can not be removed, and thus the PLZT will not be stable.

Furthermore, even a combination of the above-mentioned sintering method with HIP can not stably obtain transparent; high density ceramic material having the required high transparency and freedom from pores.

In order to overcome such problems, the present inventor has already proposed that a transparent high density ceramic material having high transparency and freedom from pores can be obtained by sintering PLZT in a vacuum up to 90% of the theoretical density and, further, applying HIP processing (Japanese Patent Laid-Open Sho No. 62-105955).

Further, as the usage of PLZT has expanded the demand for a further improvement in transparency and freedom from pores has increased, has the desire to find a method of manufacturing the same with a good productivity.

Heretofore, sintering of PLZT has required a long time for obtaining the desired high transparency and, for example, it require more than 60 hours for sintering under a normal pressure, requires more than 16 hours for a hot pressing method (hereinafter referred as HP) conducted in an oxygen or reduced-pressure atmosphere, or more than 60 hours even in a multi-step sintering process comprising HP and sintering at a normal pressure or pressure reduction and normal temperature sintering.

Further, in the technique proposed by the inventor described above, sintering conditions and HIP processing conditions, etc; are also selected depending on the PLZT compositions. However, for satisfying high light transmittance, it requires at least more than 10 hours in total, that is, more than 5 hours for sintering at a normal pressure or in vacuum and more than 5 hours for HIP and, accordingly, improvement has been demanded also from an economical point of view and operationability.

OBJECT OF THE INVENTION

It is, accordingly, an object of the present invention to provide a method of efficiently manufacturing transparent; high density ceramic material that contains each oxide of Pb, La, Zr and Ti.

SUMMARY OF THE INVENTION

The present inventor has made a study on conditions for the PLZT composition, temperature in each of the steps and atmospheres with an aim of completing both the sintering and HIP processing each within 2 hours in order to most efficiently mass producing in the industrial scale, a transparent high density ceramic material having at least 65% light transmittance and, as a result, have accomplished the present invention based on the finding that the thickness of PLZT applying the HIP processing contributes to the improvement of the transparency, as well as to the shortening of the sintering time and the HIP processing time upon.

That is, the present invention provides a process for producing transparent high density ceramic material which comprises:

sintering a green compact mainly comprising each oxide of lead, lanthanum, zirconium and titanium, in a vacuum from $1 \times 10^{-2}$ to $1 \times 10^{-5}$ Torr.

within a range of a temperature from 1150° C. to 1250° C. and a time from 0.5 to 2 hours, fabricating the thus sintered product into a thin sheet having a thickness of less than 1.5 mm, and embedding the thin sheet in a heat resistant vessel tightly charged with a powder with a grain size from 50 μm to 3000 μm and comprising at least one of fused alumina, fused zirconia and fused magnesia and then applying a HIP processing using an inert gas as a pressure medium within a range of pressure from 500 to 700 kg/cm$^2$, a temperature from 1050° C. to 1200° C. and a time from 0.5 to 2 hours.

With the production process according to the present invention, it is possible to prevent formation of pores and intrusion of excess PbO upon sintering and, further, the pores at the inside of PLZT can be reduced substantially to zero by the HIP processing.

In particular, since the sintering time and the HIP processing time can greatly be shortened as compared with the conventional method for obtaining transparent high density PLZT having high light transmittance in the present invention, it is excellent in the economical performance due to energy saving and operationability due to the shortened time, and ceramic material used for optical devices having extremely high transparency and density can be mass produced stably.

In the present invention, the aimed optical transmittance of higher than 65% is defined under the conditions for the thickness of PLZT of 0.2 mm, a measuring wavelength of 633 nm (helium-neon laser), under scattering light and including deflection loss.

DESCRIPTION OF THE ACCOMPANYING DRAWINGS

These and other objects, as well as advantageous features of the present invention will become apparent by reading the following descriptions in conjunction with the accompanying drawings, wherein FIG. 1 is a graph illustrating a relationship between the thickness and the light transmittance of a specimen;

FIG. 2 is a graph illustrating a relationship between the thickness and the sintering time in vacuum; and FIG. 3 is a graph illustrating a relationship between the vacuum degree and the light transmittance upon sintering.

DESCRIPTION OF THE PREFERRED EMBODIMENTS

Figure 1:
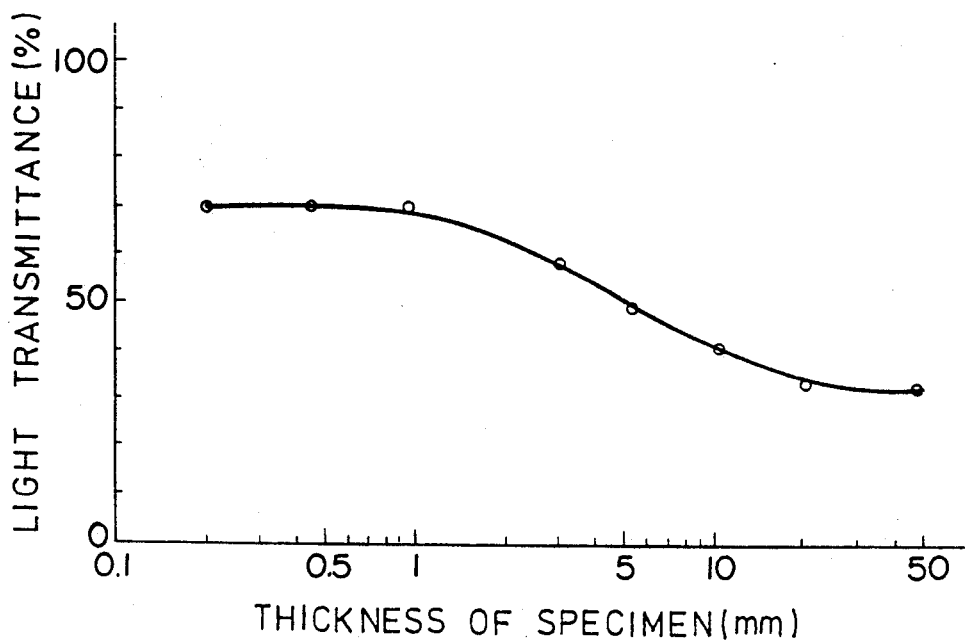

In the present invention, the composition for PLZT can properly be selected depending on the type of the optical devices, that is, in accordance with required electro-optical effect from the following ingredient composition:

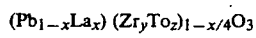
$$(Pb_{1-x}La_x)(Zr_yTo_z)_{1-x/4}O_3 \qquad (1)$$

where
x=0.05–0.25,
y/z=0.05/0.95–0.95/0.05
which can be applied to any of the compositions with similar effect.

In the case of using the ceramic material, particularly, as an optical shutter array for optical printers, it is preferred to set the composition within a range:
x=0.087–0.093
y/z=0.66/0.34–0.64/0.36
in the above formula (1).

In the present invention, a green compact product of the above composition is at first sintered into a sintering under vacuum of $1\times10^{-2}$–$1\times10^{-5}$ Torr at a temperature from 1150° C. to 1250° C. and within a time from 0.5 to 2 hours.

Sintering in vacuum is necessary for preventing the formation of pores and intrusion of excess PbO during sintering, in which the vacuum degree, temperature range and processing time can be set as described below in view of to the effect obtainable by setting the thickness of the sintering product to less than 0.5 mm upon HIP processing.

Further, although the thickness of the ceramic molding product upon sintering is not an important factor for obtaining the effect of shortening the time for sintering and HIP processing, it is preferably from 10 mm to 50 mm in view of the deformation upon sintering, fabricability subsequent steps, productivity, etc.

The vacuum degree during sintering is preferably within a range from $1\times10^{-2}$ to $1\times10^{-5}$ Torr. No desired effect for preventing the formation of pores and invasion of excess PbO can be obtained with the vacuum degree of lower than $1\times10^{-2}$ Torr and, on the other hand, PLZT is discolored by reduction, thereby resulting in deterioration of the characteristics if the vacuum degree is higher than $1\times10^{-5}$ Torr.

After setting the vacuum degree within such a range, when the sintering temperature is set to a range of 1150° C. to 1250° C. depending on the composition of PLZT, desired property such as optical transmittance can be obtained within a short processing time of from 0.5 to 2 hours.

Extension of the sintering time does not contribute to the improvement of the property and it is not undesired in view of the economical property, as well as excess heating and long time sintering particularly results in evaporization of PbO making the PLZT property unstable.

Then, HIP processing is applied to the resultant sintering product, which is fabricated into a thin sheet with a thickness of less than 1.5 mm.

The thin-sheet sintering product is embedded in a heat resistant vessel tightly packed with a powder with a grain size from 50 μm to 3000 μm and comprising at least one of fused alumina, fused zirconia and fused magnesia to which HIP processing is applied.

The effect obtained by reducing the thickness of the sintering product to less than 1.5 mm upon HIP processing, resides in the shortening of the sintering time and the HIP processing time as will be detailed in the subsequent example.

When the transparency of the final product was investigated, a long time sintering is required for obtaining a desired transmittance if the thickness of the sintering product upon HIP processing exceeds 1.5 mm.

In particular, grain growth of the sintering product can be suppressed by completing the sintering at a relatively low temperature and in a short period of time. In the manufacturing method according to the present invention, the average grain size of the final product is about 0.5 μm to 5 μm and, in particular, a product with an average grain size of about 0.5 μm to 2 μm can be obtained by selecting an optimul condition. In the conventional method described above, since sintering at high temperature and for long time is inevitably necessary for obtaining a desired transparency, the average grain size of the final product exceeds 5 μm and, usually, is within a range about from 10 μm to 20 μm. The present inventor has confirmed that the average grain size gives a great effect on the property of the optical shutter, etc; That is, in an optical shutter array, etc. used for optical printers, it is demanded to suppress the variation of the amount of light for each shutter to less than 1/50 for printing clear letters. As the dot density (number of dots per 1 inch) has been improved to 300 DPI, 600 DPI, etc.; the aperture of the optical shutter has been reduced, for example, to 60 μm, 30 μm, etc. Accordingly, if the average grain size of particles forming each of the optical shutters is large (the number of particles is small), the effect due to the variation of the electro-optical effect of individual particles is increased making it necessary to apply a voltage different on every optical shutters in order to decrease the variation of the amount of light. The present inventor has confirmed that the average grain size has to be reduced to less than 1/10 of the aperture of the optical shatter in order to satisfy demanded variation in the amount of light amount. Further, as the average grain size is reduced, the effect caused by chipping (detachment of particles) upon fabrication is reduced to facilitate fabrication.

Further, in view of the fabrication of the sintering product to the thin sheet, handling thereof, etc., the thickness is preferably within a range from 0.2 mm to 1.5 mm and, particularly, from 0.3 mm to 1.0 mm.

As the application use of PLZT described above, it is often used at a thickness of less than 1 mm and, particularly, it is desirable to apply the HIP processing after fabrication into a thickness nearly to that of the final product within the above-mentioned range in view of the productivity when taking the mirror finishing fabrication in the subsequent step, etc. into consideration.

A heat resistant vessel for HIP processing is desirably made of such dense material that a pressure medium gas does not easily penetrate from the surface of the vessel, and a lid for the vessel is rendered slightly gas permeable so that air in the furnace is easily replaced with an atmospheric gas in the preparatory step for the processing. As the powder tightly packed in the heat resistant vessel, fused alumina, zirconia and magnesia suitable since these fused (electro-molten) oxides are sufficiently chemically stable within the range of the processing temperature described above and comprise coarse crystal grains and their aggregated particle powder, sintering of the powder per se is not taken-place and they have preferred purity not to react easily with PLZT, etc.

Further, since pores, etc; are not scarcely present at the inside of particles, they are not powderized after the pressing, can be used repeatedly and are easily available industrially.

However, since sintering proceeds slowly even the fused oxides described above if they are fine powder, and it is necessary to prevent scattering during handling and to facilitate the replacing operation of air before pressing with a pressure medium gas, it is desirable that the particles have a grain size of greater than 50 μm.

However, fused oxides of excessively great size are not desirable since voids are increased even if the particles are tightly charged in the vessel.

Further, in a case of using fine powder and coarse powder by properly mixing them, it is theoretically possible that the grain size of the coarse particle is about several millimeters, but the grain size is preferably less than 3000 μm, since there is a difficulty in view of the operationability if the grain size is remarkably different.

In the present invention, ceramic material of more stable property can be obtained by conducting vacuum sintering while embedding the green compact into the heat resistant vessel tightly charged with the powder as described above.

A pressure medium gas at high temperature is required for HIP processing and, particularly, an inert gas is desirable. A small amount of an oxygen-containing Ar gas may be used in order to prevent evaporation of oxygen in the composition of PLZT.

Further, in view of the effect obtained by decreasing the thickness of the sintering product to less than 1.5 mm upon HIP processing, it is possible to set the pressure, the temperature range and the processing time upon processing as described below.

That is, it has been confirmed that a desired property can be obtained by a processing time from 0.5 to 2 hours when setting the pressure to 500–700 kg/cm$^2$ and the range of temperature from 1050° C. to 1200° C. in accordance with the range of PLZT composition. In particular, each of the sintering time under vacuum and the HIP processing time can be reduced to less than 1 hour by setting the thickness of the sintering product to less than 1 mm upon HIP processing.

Further, PLZT of high transparency and high density having more stable property can be obtained by applying annealing in an oxygen atmosphere at 800° C. to 1200° C. for about 1 to 2 hours after the HIP processing.

EXAMPLE

EXAMPLE 1

Using a PLZT powder conditioned to a composition represented by the formula (1) described above in which X=0.09, y=0.65 and z=0.35, a plurality of green compacts each size 60φ×50 mm was obtained under a pressure of 3 t/cm$^2$.

These green compacts were sintered under vacuum of $1\times10^{-3}$ Torr and under the conditions of 1200° C.×1 hr.

After fabricating the thus obtained sintering product into a thin sheet use a slicing machine each size 0.2 to 50 mm thickness, they were embedded in an aluminum heat resistant vessel tightly charged with a fused zirconia powder with an average grain size of 300 μm, which was then loaded in a high temperature high pressure furnace.

Then, HIP processing was applied in a furnace using an Ar gas as a pressure medium under the processing temperature at 1150° C., pressure at 600 kg/cm$^2$, for 1 hour.

Then, from the thin sheet after the HIP processing, transparent ceramic material having 0.2 mm thickness and mirror-polished on both surface thereof was obtained. The light transmittance was measured by using a helium-neon laser at a wavelength of 633 nm (including reflection loss under the foregoing conditions) and the results are shown in Table 1.

As apparent from FIG. 1, if the thickness of the sintering product (thin sheet) upon HIP processing is less than 1.5 mm, PLZT of high light transmittance of greater than 65% can be obtained even if each of the sintering time and the HIP time is about one hour and, particularly, high transmittance amounting to 69% can be obtained in this example.

When the density of PLZT with 1 mm thickness was measured, it was 7.80 g/cm$^3$, and it was confirmed that the product has high density of 100% as compared with the theoretical density of 7.80 g/cm$^3$.

EXAMPLE 2

In the manufacturing method in Example 1, the sintering time was controlled such that the light transmittance of each of the final products obtained from the thin sheet fabricated into a predetermined thickness was greater than 65% and the results are shown in Table 2.

Figure 2:
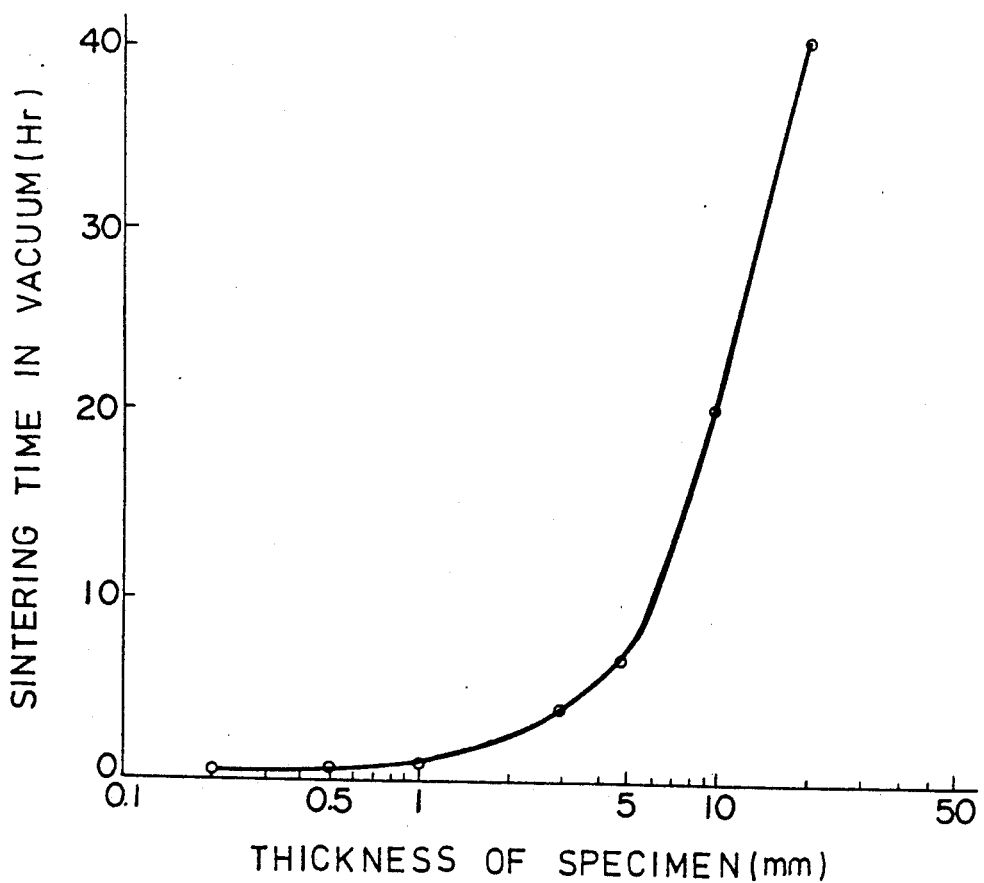

As apparent from FIG. 2, if the thickness upon HIP processing exceeds 1.5 mm, the sintering time becomes extremely long to require an extremely long time processing such as 7 hours for 5 mm thickness, more than 40 hours for the thickness greater than 20 mm. Thus, it has been confirmed that it is not suitable to industrial mass production when economical factor, operationability, etc. into consideration.

EXAMPLE 3

The green compact obtained in Example 1 was sintered under various vacuum degrees from 1 to $1 \times 10^{-6}$ Torr under the conditions of 1200° C. $\times$ 1 hr.

After fabricating the resultant sintering product into a thin sheet of 1 mm thickness, the same HIP processing as in Example 1 was applied and a transparent ceramic material having 0.2 mm thickness and applied with mirror polishing on both sides thereof was obtained from the thin sheet after the processing, and light transmittance was measured by using a helium-neon laser at a wavelength of 633 nm (including reflection loss under the conditions described above). The results are shown in FIG. 3.

Figure 3:
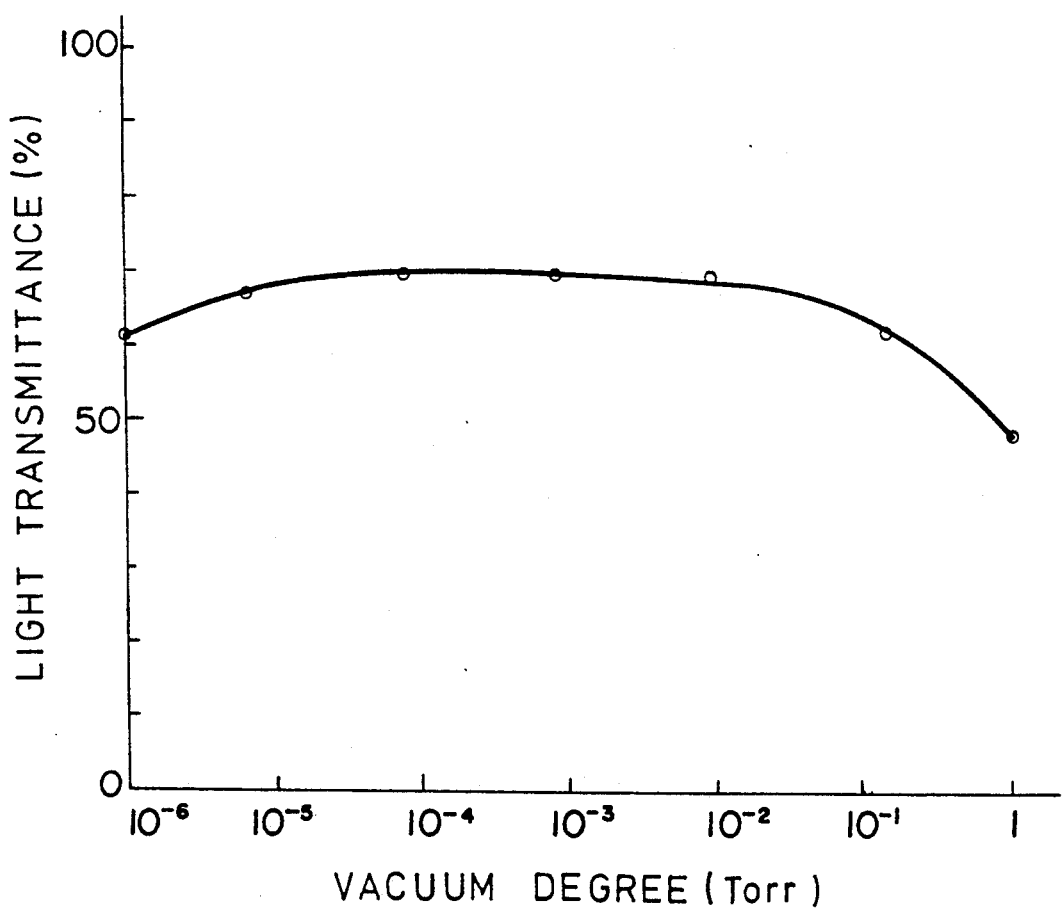

As apparent from FIG. 3, it can be seen that a vacuum degree of $1 \times 10^{-2}$ to $1 \times 10^{-5}$ Torr is necessary upon sintering in order to obtain highly transparent PLZT.

EXAMPLE 4

In the manufacturing method of Example 1, the sintering time was adjusted such that the light transmittance (with the thickness of 0.2 mm after applying mirror finishing to both sides) is greater than 65% in each of the final products, for the thickness of 0.5 mm and 10 mm during HIP processing and the average grain size of each final product was measured (sintering time of 1 hour and 20 hours respectively).

The grain size was about 1 to 1.5 $\mu$m for the product having a thickness of 0.5 mm upon HIP processing, while the average grain size was 20 to 30 $\mu$m for the product having a thickness of about 10 $\mu$m during HIP processing. These transparent high density ceramic materials were arranged in an optical shutter array used for optical printers with dot density of 600 DPI (shutter aperture of 30 $\mu$m) and, when the variation of the amount of light was measured under the same conditions, variation of the amount of light could be suppressed to less than 1/50 for the product having a thickness of 0.5 mm during HIP processing, whereas the variation the amount of light was as large about 1/20 for the product having 10 mm thickness upon HIP processing, which could not satisfy the requirement at present.

What is claimed is:

1. A method of manufacturing a transparent, high density ceramic material which comprises:
    sintering a green compact mainly comprising an oxide of each of lead, lanthanum, zirconium and titanium in a vacuum from $1 \times 10^{-2}$ to $1 \times 10^{-5}$ Torr within a temperature range of 1150° C. to 1250° C. and for a time from 0.5 to 2 hours to form a sintering product,
    fabricating said sintering product into a thin sheet having a thickness of less than 1.5 mm,
    positioning said thin sheet in a heat resistant vessel so that it is surrounded by a tightly packed powder comprised of at least one oxide selected from the group consisting of fused alumina, fused zirconia and fused magnesia, said powder having a grain size of 50 $\mu$m to 3000 $\mu$m, and then
    hot isostatically pressing said thin sheet at a pressure of 500 to 700 kg/cm$^2$, a temperature of 1050° C. to 1200° C. and for a time for 0.5 to 2 hours using an inert gas as a pressure medium.

2. A method of manufacturing a transparent high density ceramic material as defined in claim 1, wherein the green compact has the following ingredient composition:

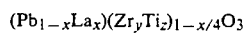

$$(Pb_{1-x}La_x)(Zr_yTi_z)_{1-x/4}O_3$$

wherein
x = 0.086–0.093
y/z = 0.66/0.34–0.64/0.36.

3. A Method of manufacturing a transparent high density ceramic material as defined in claim 1, wherein the thickness of the sintering product upon hot isostatic pressing is from 0.3 mm to 1.0 mm.

4. A method of manufacturing a transparent high density ceramic material as defined in claim 1, wherein the thickness of the green compact upon sintering is from 10 mm to 50 mm.

5. A method of manufacturing a transparent high density ceramic material as defined in claim 1, wherein at the time of sintering in vacuum the green compact is embedded in a heat resistant vessel packed with a powder comprising at least one of fused alumina, fused zirconia and fused magnesia.

6. A method of manufacturing a transparent high density ceramic material as defined in claim 1, wherein annealing is applied in an oxygen atmosphere within a range of a temperature from 800° to 1200° C. and for a time of from 1 to 2 hours after the hot isostatic pressing.

7. A transparent, high density ceramic material with light transmittance of higher than 65% prepared by the manufacturing method of claim 1 under conditions of a thickness of 0.2 mm for transparent high density ceramic material, at a measuring wavelength of 633 mm (helium-neon laser), under scattered light and including reflection loss.

8. A transparent high density ceramic material as defined in claim 7, wherein the average grain size is from 0.5 $\mu$m to 5 $\mu$m.

9. A transparent high density ceramic material as defined in claim 8, wherein the average grain size is from 0.5 $\mu$m to 2 $\mu$m.

* * * * *